July 28, 1970 L. A. ARCHER 3,522,010
COMBUSTIBLE GAS DETECTOR SAMPLING HEAD
Filed Jan. 10, 1968 2 Sheets-Sheet 1

INVENTOR.
Lee A. Archer
BY
Darby, Robertson + Vandenburgh
Att'ys.

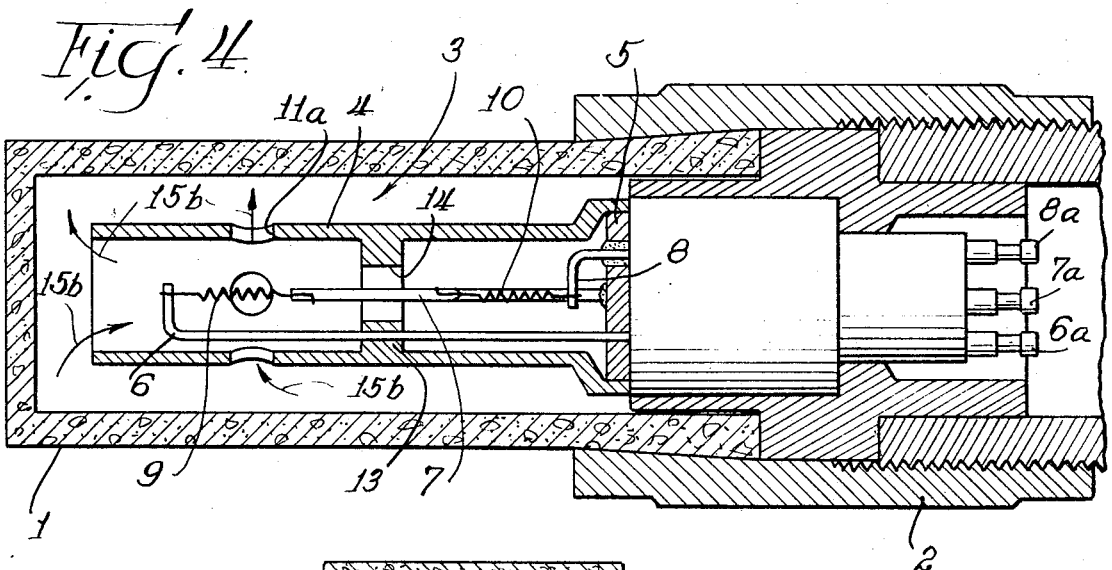
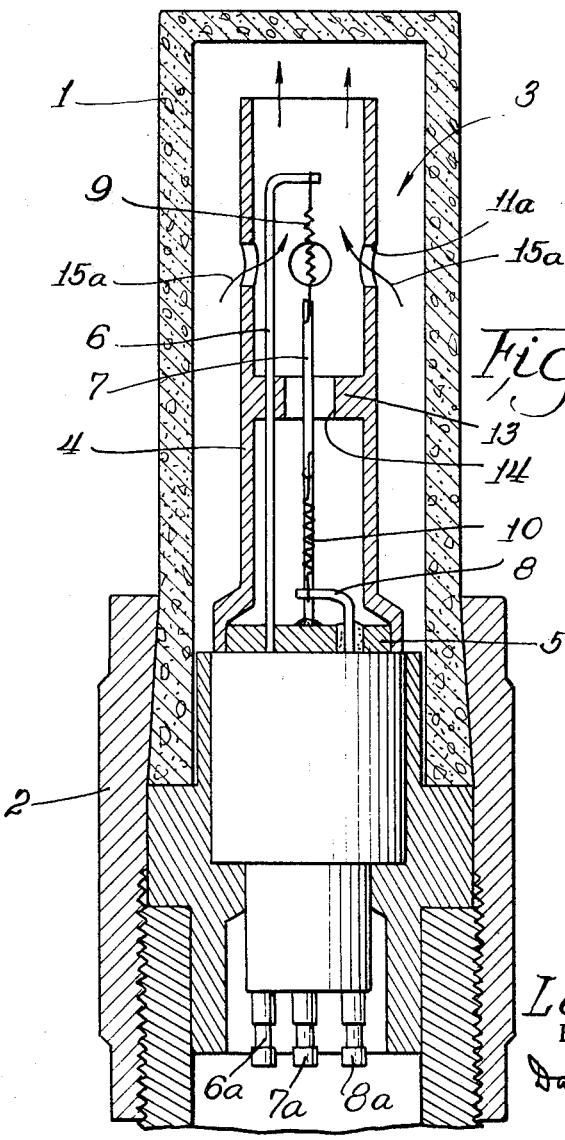

United States Patent Office

3,522,010
Patented July 28, 1970

3,522,010
COMBUSTIBLE GAS DETECTOR SAMPLING HEAD
Lee A. Archer, Wheaton, Ill., assignor to Erdco Engineering Corporation, Addison, Ill., a corporation of Delaware
Filed Jan. 10, 1968, Ser. No. 696,835
Int. Cl. G01n 27/16
U.S. Cl. 23—254
7 Claims

ABSTRACT OF THE DISCLOSURE

The detector and reference filaments of a gas detector sampling head are arranged relative to each other and relative to the gas sample inlet and outlet so that the direction and velocity of flow of the gas sample and the disposition of the products of combustion at the detector filament are controlled in such a way that the detector filament is differentially affected to register the presence of combustible gases with minimum extraneous effects. The sampling head may be used in vertical or horizontal position. Progressively increasing pitch of the catalytic metal filaments toward their middle portions, prevents excessively high temperatures at such middle portions, resulting in lengthened useful lives of the filaments.

BACKGROUND OF THE INVENTION

The invention herein described relates to improvements in the sampling heads of combustible gas detectors such as that described in Peterman Pat. No. 3,239,828. The sampling head contains the detector and reference catalytic filaments (e.g., platinum wire) which form two of the legs of the Wheatstone bridge signal-originating element of the apparatus.

When an electrically heated filament, such as the detector or reference filament of the combustible gas detecting apparatus to which this invention relates, is exposed to gases or vapors of changing condition or composition, a change in the temperature of the filament will result. This change may be due to (a) a change in the heat transfer characteristics of the gases, such as thermal conductivity, specific heat, etc., (b) a change in the temperature of the gases, (c) chemical reaction such as catalytic combustion at a catalytically active filament surface, or (d) a change in flow conditions, e.g., velocity or degree of turbulence. The change in temperature of the filament is normally accompanied by a change in the resistance of the filament and therefore the current carried thereby. This change can conveniently be measured by means of a Wheatstone bridge.

Gas detectors utilizing these basic principles to a greater or a lesser extent are in common use. The accuracy and stability of these instruments are determined largely by the selectivity of a particular instrument to a selected property of the gases. Changes due to other effects, including changes in other properties and conditions, must be eliminated or compensated for to the degree necessary to satisfy the needs of the instrument's application.

In the detector apparatus of Pat. No. 3,239,828, the detector filament is exposed to the combustible gas-air mixture and the other filament is exposed to a combustible gas-free reference air sample at the same temperature as the gas-air mixture. This arrangement compensates the bridge for voltage and temperature variations to a high degree. Other effects, however, such as changes in thermal conductivity, specific heat, and density due to humidity variations in the sample stream, for example, may cause the calibrated balance point of the bridge to drift.

One known method of overcoming this atmospheric unbalance is to operate the reference filament in a cavity which is exposed to the sample air stream through only a very small or otherwise restricted opening or passageway. With this arrangement, both filaments operate in environments of substantially the same composition when no combustible gas is present. When combustible gas is present, the small amount that diffuses into the cavity of the reference filament is insignificant as compared with the amount present in the cavity containing the detector filament and appropriate compensation can be made in the calibration of the instrument. The main disadvanages in this system are that it does not permit the following of rapid changes in humidity and it cannot compensate for large changes in humidity because the restricted interchange of moisture causes the reference cavity moisture to be heated through a smaller temperature differential during the reference convection cycle.

Another compensating method is to make the reference filament catalytically inactive by the use of "poisoning" agents, and place it in the same space, subject to the same ambient gases, as the detector filament. This method is of academic interest only since the poisoning agent may be dissipated by age or accidential overheating, making the instrument inaccurate. Still another approach is to coat both filaments with glass or other ceramic and provide a separate catalytic coating on the surface of the detector filament coating. Both filaments may then be operated in the same environment; however, the response of such an instrument is delayed by the insulating effect of the coating.

SUMMARY OF THE INVENTION

The object of this invention is to provide an improved sampling head for combustible gas detectors which, with particular reference to the sensing filaments and the useful signals for which they are responsible, will be unaffected by large or rapid changes in temperature, humidity, or pressure of the sample gases, or atmospheric composition, or changes in the voltage applied to the bridge, while providing very rapid and accurate response to the presence of combustible gases. The inventive concept embraces means for controlling the flow of sample air to both detector and reference filaments and for the controlled shielding of the reference filament from raw sample air to the end that the instrument will supply uniform and dependable signals under varying conditions of use.

It is a further object of this invention to provide an improved filament design which will have a greatly extended service life.

In brief, the invention contemplates the arrangement of the detector and reference filaments within a chimney-like envelope with provision for the scouring of the detector filament by convection currents of the sample gas-air mixture while providing controlled movement of air to the reference filament whereby to effect automatic compensation for extraneous effects while realizing the differential heating of the detector filament to provide the required signal. Convection currents are controlled with respect to both the detector and the reference filaments by the location and dimensioning of the openings through which the convection streams must pass. Advantage is taken of the reduction in the combustible gas content of the sample air resulting from combustion as the air passes by the catalytic detector filament, the air containing the products of this combustion being used to a controlled extent to shield the reference filament, which is also catalytic, from the less altered sample gases. Advantage is also taken of the tendency of gases to stay close to heated surfaces.

The filaments generally employed comprise helical coils of platinum wire although other metals may be used. Excessive loss of the metal due to excessively high temperatures of the middle portion of the coil may be minimized by progressively increasing the pitch of the coil windings from the ends toward the center portion to thereby provide a more uniform temperature and, therefore, uniform loss of the metal throughout the length of the coil. By this expedient, the useful service life of the very expensive filaments may be greatly extended.

DESCRIPTION OF THE DRAWING

In the accompanying drawing,

FIGS. 3 and 4 are cross-sectional views identical to that of FIG. 2 but differently oriented to illustrate operation in different positions.

DESCRIPTION OF PREFERRED EMBODIMENTS

Figure 1:
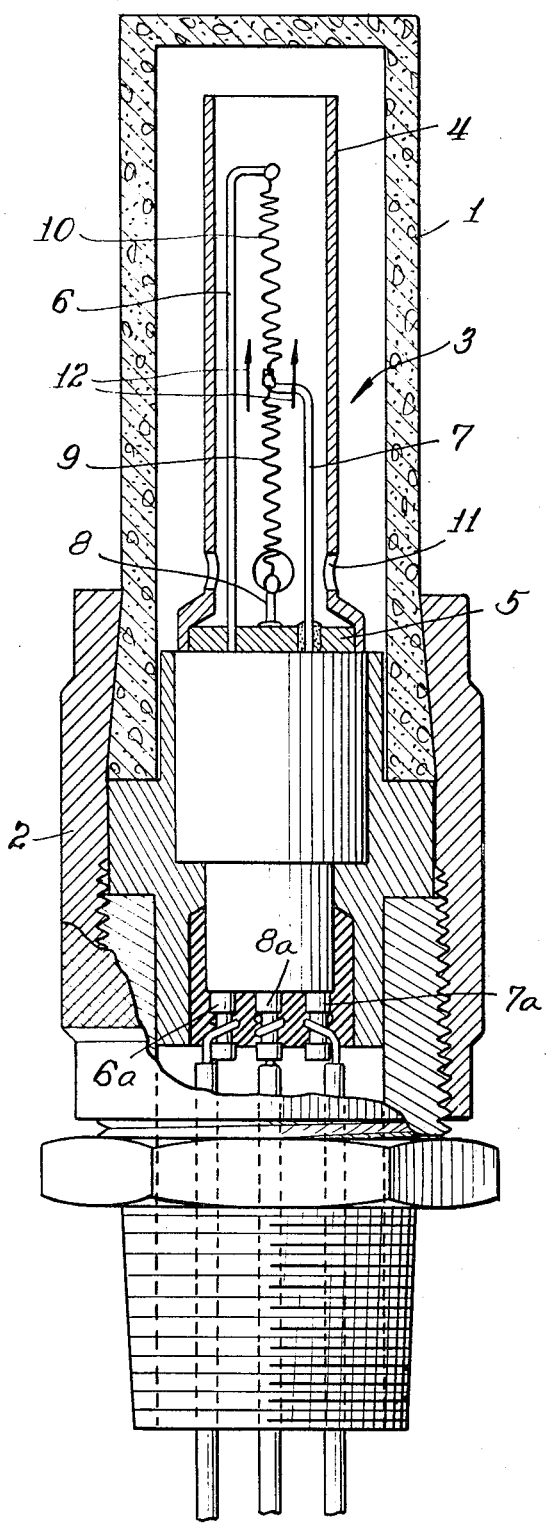
FIG. 1 is a side view, partly in section, of a diffusion type sampling head for a combustible gas detector embodying one form of the invention.

The supporting base structure of the sampling head illustrated in FIG. 1 is more or less conventional and will not be described in detail. A porous diffusion cap 1 of sintered metal or other inert material, secured to the base portion of the head by means of ferrule 2, provides an enclosure for the sensing filament subassembly, designated, generally, by the numeral 3. This diffusion cap provides a relatively quiescent space within which the filaments operate, permitting the air and other gases surrounding the head to diffuse into and out from the interior of this space for sampling and detection purposes.

The air within the sampling head is constantly in motion, flowing over the filaments to enable the latter to signal the combustible gas content, if any, of the air. Convection currents are created and maintained by the hot filaments and the filament subassembly 3 is so constructed that the currents are brought to bear upon the respective filaments with velocity and direction calculated to produce the desired signal characteristics from the instrument. As will be seen as the description proceeds, provision is made for the continuous scouring of the detector filament by raw sample air while maintaining a less active but changing air environment at the reference filament. In certain positions of use of the sampling head, advantage is taken of the stream of air leaving the detector filament and containing the products of combustion of the burned gases to shield the reference filament from raw air.

The sampling head with filament subassembly 3 shown in FIG. 1 is intended for use in the position shown in the drawing, that is, directed vertically upwardly. An open-topped chimney 4, preferably metallic, is mounted upon a base 5 of insulating material which also serves as a supporting header for metal pins 6, 7 and 8, which, in turn, support detector filament 9 and reference filament 10 and make electrical connections therewith. Electrical connection with the pin conductors is provided by prongs 6a, 7a, and 8a. Four small openings 11 are provided in the bottom end of the chimney 4.

In the operation of the device, electrical currents of sufficient magnitude to heat the filaments to a temperature at which combustion of combustible gases passing along the surfaces of the filaments will be catalytically oxidized are continuously supplied to the filaments. Ambient gases are heated by these hot filaments and by any combustion that takes place at the filament surfaces and convection currents are consequently induced within the chimney 4, gases being drawn into the chimney through openings 11 and leaving at the open top. This continuous movement of gases takes place regardless of the presence or absence of combustible component gases or vapors. This convection action also induces passage of gases through the diffusion cap 1 to provide a continuing supply of sample gases from the space surrounding the sampling head.

In accordance with the intended operation of the device, combustible gases present in the sample flowing into the chimney through openings 11 are caused to burn as they pass by the detector filament 9 due to the catalytic effect of the platinum or other filament metal. This results in increasing the temperature, and, therefore, the resistance, of the detector filament. The air containing the products of combustion from detector filament 9 rise with the convection currents within the chimney, as is indicated by arrows 12, providing a substantially inert stream core clinging to the hot wires and flowing over the reference filament 10 so that there is little or no combustion effect on this filament. In this way, the desired unbalance, indicating the presence of combustible gases in the gas sample, is achieved for signaling, as desired, by the apparatus.

To an appreciable extent, metallic chimney 4 tends to equalize the temperatures of the gases ambient to the two filaments. However, to insure that detector filament 9 and reference filament 10 will have equal resistance values when the gas stream passing through the sampling head contains no combustible components, the detector filament may be made slightly longer than the reference filament to compensate for the normally somewhat higher temperature of the reference filament since it is influenced by the gases heated by the detector filament. Once calibrated, the response of both filaments to atmospheric and line voltage variations will be substantially identical and, consequently, there will be no zero drift.

The dependability and general performance of sampling heads made and operating as described have been found to be excellent when operated in upwardly directed vertical position, as shown, or within approximately fifteen degrees of vertical. The continuous scouring of the detector filament by the sample air convection currents assure vigorous and rapidly responsive signals from the apparatus.

Figure 2:
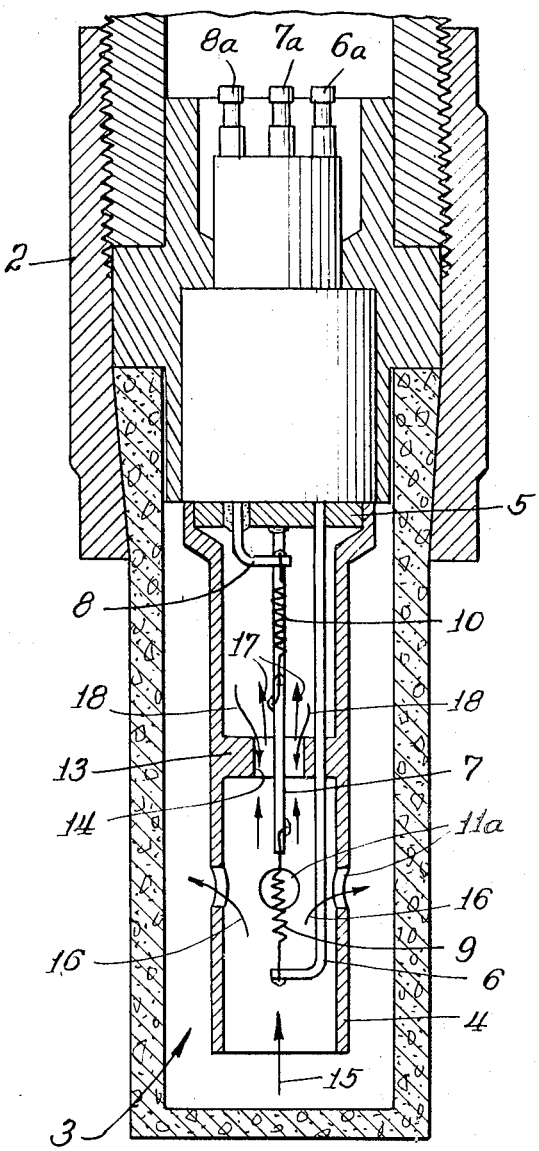
FIG. 2 is a cross-sectional view of a form of the sampling head intended for use in either horizontal or vertical position.

The principles employed in devising the sampling head of FIG. 1 have been adapted, with some necessary modifications, to a simpling head structure which may be used in either upwardly or downwardly directed vertical position or in horizontal position. This form of the invention is illustrated in FIGS. 2–4. The principal changes, made to adapt the device of FIG. 1 to use in other positions, are in the chimney construction. Instead of having openings 11 near the base of the chimney; that is, opposite from the open end, the openings, designated 11a, are provided at a predetermined location between the middle and open end of the chimney. Also, a wall 13, having a central opening 14, is arranged in the chimney about halfway between the open end and the base. Detector filament 9 and the reference filament 10 are supported and electrically connected to the detecting apparatus by means of pins 6, 7 and 8.

Accuracy and dependability of this versatile sampling head depend upon certain rather critical structural considerations. These dimensional considerations will be discussed in the light of the factors that are determinative.

Openings 11a must be spaced a sufficient distance from the open end of chimney 4 to provide a length of chimney which will function to insure a steady convection current of sample gases to and along the detector filament 9 regardless of the installed position of the sampling head. The size of openings 11a also has a bearing on the nature and velocity of the convection current. It is desired that sufficient velocity be attained to continuously scrub the detector filament surfaces with new sample gases so that the filament will respond forcefully and quickly to the condition of the gases that it is intended to sense. The relative positions of the filament and openings are such that the inner end of the filament is at approximately the level of the inner edges of the openings.

The opening 14 in wall 13 must be large enough to permit the optimum flow of gases therethrough and small enough to prevent excessive flow of raw sample gas to the reference filament when the sampling head is used in horizontal position. The influence of wall 13, insofar as its function is significant, will be referred to below.

Referring particularly to FIG. 2, the sampling head here shown is installed in a vertically down position as it might be, for example, when located near the floor to detect combustible gases that are heavier than air. In this position, the air containing the combustible gases diffusing into the sampling chamber is drawn through the open bottom end of chimney 4 as a convection current motivated by the heat from filament 9. The peripheral portion of this convection stream flows out from the chimney through openings 11a as is indicated by arrows 16, while the core of this raw sample stream passes over the surfaces of detector filament 9, catalytically oxidizing any combustible gases present, and then continues upwardly, following closely along pin 7 and through opening 14 to pass over filament 10. Due, in part, to the cooling effect of the portion of the chimney surrounding filament 10, the gases then flow downwardly along the interior of the chimney and exit through opening 14 as is indicated by arrows 18. It will be understood that the gases comprising the core portion of the stream passing upwardly through opening 14 comprise the products of such combustion as took place at filament 9 and that this core portion shields the reference filament 10 from raw sample air so that substantially no combustion takes place at the reference filament. The result is a very satisfactory differential in the temperatures of the detector and reference filaments due to the combustion at only the detector filament and absence of combustion at the reference filament, providing the desired electrical signal to indicate the presence of combustible gases.

The sampling head as illustrated in FIG. 3 is oriented in a vertically up position as it might be, for example, when located on a wall near a ceiling to detect combustible gases that are lighter than air. In this position, the mixture of air and combustible gases are drawn into chimney 4 through openings 11a, as is indicated by arrows 15a, as the gases within the portion of the chimney above openings 11a are heated by filament 9. The location and size of openings 11a are such that an ample supply of sample gases continuously impinge upon filament 9, scrubbing the hot catalytic surfaces for the continuous combustion of combustible gaseous components and consequent elevation of the normal temperature of this filament. At the same time, convection currents induced by reference filament 10 effect the continuous, but relatively limited, flow of gases through opening 14 and along the surfaces of the reference filament. While combustible gases here present will burn under the catalytic influence of the filament, the quantity of the gases supplied, and, therefore, the heat generated by combustion, is very much smaller than that influencing detector filament 9, so that the desired differential in current flow is manifested in the respective filaments. In this instance, appreciable combustion at the reference filament is desirable to partially offset the vigorous combustion which takes place at the detector filament in this position of the sampling head.

The operation of the sampling head in horizontal position is indicated in FIG. 4. In this position, to even a greater extent than in the vertically up position of FIG. 3, the scouring of the detector filament by the convection currents is very vigorous and the quantity of combustible gases burned are proportionately great. The sample gases flow into the chimney 4 through the opening or openings 11a which are lowermost in this position of the sampling head and through the lower part of the open end of the chimney, passing over detector filament 9. The gases then leave the area through uppermost openings 11a and the upper portion of the open end of the chimney, all as is indicated by arrows 15b. At the same time, heat from reference filament 10 induces a relatively limited flow of gases into the space which surrounds it, the gases flowing in through the lower part of opening 14 and flowing out through the upper part of opening 14, the total flow being controlled by the size of the opening. It has been found that the relative quantities of combustible component gases burned at the detector and reference filaments are such that the magnitude of the differential or unbalance as between the two filaments is approximately the same for a given combustible gas content as that which obtains when the sampling head is arranged in a vertical position.

Although the form of sampling head illustrated in FIG. 1 is, in general, most effective, the form illustrated in FIGS. 2–4 has the advantage of flexibility of application. The signal-creating differential in the temperatures of the detector and reference filaments of the head when used in the different positions shown in FIGS. 2–4 are of about the same magnitude. This results from the structural features described and is, of course, very desirable.

The improved form of filament is illustrated only in FIG. 1 although it may be used in any form of the instrument. When the convolutions of the spiral wire filaments are equally spaced throughout their lengths, the temperature of the middle portion is very much higher than that of the end portions. The consequence is greater loss of the metal and resulting relatively early failure of the filament at its mid-section. With the greater spacing of the convolutions in the middle portion, as illustrated in FIG. 1, the temperature of the filament is substantially uniform from end to end. In this way, excessive heat, and therefore, excessive loss of the platinum or other metal at the middle of the filament is avoided and the life of the filament greatly extended.

What is claimed is:

1. In a combustible gas detector sampling head having a diffusion cap mounted upon a base to provide an enclosure, an improved sensing filament subassembly mounted upon said base within said enclosure, said subassembly comprising an elongated chimney mounted upon said base and closed at one end and open at the other end thereof, said chimney having one or more openings therein at a sufficient distance from said open end to provide a functional chimney section between said openings and said open end, and catalytic metal wire detector and reference filaments mounted coaxially within said chimney in end-to-end relationship, said detector filament being arranged at a location between said openings and said open end of said chimney whereby to insure the flow of gases over the surface of said detector filament when said filaments are heated.

2. Sampling head structure in accordance with claim 1 wherein the detector filament is arranged between the base and the reference filament and the openings are located adjacent the end of said detector filament nearest said base.

3. Sampling head structure in accordance with claim 1 wherein a filament is in the form of a helical coil whereof the pitch of the turns forming the middle portion of the filament is substantially greater than the pitch of the turns forming the end portions.

4. Sampling head structure in accordance with claim 3 wherein the filaments are composed of platinum wire.

5. Sampling head structure in accordance with claim 1 wherein the electrical resistance of the unheated detector filament is greater than that of the unheated reference filament.

6. Sampling head structure in accordance with claim 1 wherein a centrally apertured transverse wall is arranged within the chimney at a location between the filaments to restrict the flow of gases within said chimney from the zone of one filament to that of the other.

7. In a combustible gas detector sampling head adapted to be used in either horizontal or either vertical position and having a diffusion cap mounted upon a base to provide an enclosure, an improved sensing filament subassembly mounted upon said base within said enclosure, said subassembly comprising an elongated chimney mounted upon said base and closed at one end and open at the other end thereof, a centrally apertured transverse wall arranged within said chimney at a location approximately midway between the ends thereof, a catalytic metal wire reference filament arranged at the axis of said chimney between the closed end thereof and said apertured wall, and a catalytic metal wire detector filament arranged at the axis of said chimney between said apertured wall and the open end of said chimney, said chimney having one or more openings therein adjacent the end of said detector filament remote from said open end of said chimney.

References Cited

UNITED STATES PATENTS

| | | | |
|---|---|---|---|
| 3,307,613 | 3/1967 | Rexer | 23—254 X |
| 3,421,362 | 1/1969 | Schaeffer. | |
| 3,440,017 | 4/1969 | Palmer. | |
| 3,460,910 | 8/1969 | Emich | 23—232 |
| 3,094,393 | 6/1963 | Sieger. | |

MORRIS O. WOLK, Primary Examiner

R. E. SERWIN, Assistant Examiner

U.S. Cl. X.R.

23—255; 73—23, 27